US011756723B2

(12) United States Patent
Murakami

(10) Patent No.: US 11,756,723 B2
(45) Date of Patent: Sep. 12, 2023

(54) MULTILAYER COIL COMPONENT

(71) Applicant: Murata Manufacturing Co., Ltd., Kyoto-fu (JP)

(72) Inventor: Naoyuki Murakami, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 491 days.

(21) Appl. No.: 16/814,893

(22) Filed: Mar. 10, 2020

(65) Prior Publication Data

US 2020/0294713 A1 Sep. 17, 2020

(30) Foreign Application Priority Data

Mar. 11, 2019 (JP) ................................ 2019-043707

(51) Int. Cl.
*H01F 27/32* (2006.01)
*C03C 3/091* (2006.01)
(Continued)

(52) U.S. Cl.
CPC ........... *H01F 27/323* (2013.01); *C03B 19/06* (2013.01); *C03C 3/091* (2013.01); *C03C 4/16* (2013.01);
(Continued)

(58) Field of Classification Search
CPC ............. H01F 17/0013; H01F 27/2804; H01F 2027/2809; H01F 17/006; H01F 5/003;
(Continued)

(56) References Cited

U.S. PATENT DOCUMENTS 6,356,181 B1 * 3/2002 Kitamura ............ H01F 17/0013
336/200
9,030,287 B2 * 5/2015 Motomiya .......... H01F 17/0013
336/200

(Continued)

FOREIGN PATENT DOCUMENTS

CN 107887105 A * 4/2018 ............. H01F 17/00
CN 107887105 A 4/2018
(Continued)

OTHER PUBLICATIONS

An Office Action mailed by the Korean Intellectual Property Office dated Mar. 10, 2021, which corresponds to Korean Patent Application No. 10-2020-0027674 and is related to U.S. Appl. No. 16/814,893 with English language translation.
(Continued)

*Primary Examiner* — Tszfung J Chan
(74) *Attorney, Agent, or Firm* — Studebaker & Brackett PC

(57) ABSTRACT

A multilayer coil component includes a component element assembly in which an inner conductor is disposed and an outer electrode disposed on the surface of the component element assembly. The component element assembly includes a first dielectric glass layer in which the inner conductor is embedded and second dielectric glass layers that are thin layers disposed on respective principal surfaces of the first dielectric glass layer. The primary component of each of the first dielectric glass layer and the second dielectric glass layers is formed of a glass material and has a filler component containing at least quartz, and the second dielectric glass layers have a lower quartz content than the first dielectric glass layer.

15 Claims, 5 Drawing Sheets

(51) Int. Cl.
*C03C 4/16* (2006.01)
*C03B 19/06* (2006.01)
*H01F 27/29* (2006.01)
*H01F 17/00* (2006.01)
*H01F 27/28* (2006.01)

(52) U.S. Cl.
CPC ..... *H01F 17/0013* (2013.01); *H01F 27/2804* (2013.01); *H01F 27/29* (2013.01); *C03C 2201/10* (2013.01); *C03C 2201/32* (2013.01); *H01F 2017/002* (2013.01); *H01F 2017/0066* (2013.01); *H01F 2017/0093* (2013.01)

(58) Field of Classification Search
CPC ............. H01F 2017/0093; H01F 27/29; H01F 27/292; H01F 27/323; H01F 2017/002; H01F 2017/0066; C03C 3/091; C03C 4/16; C03C 2201/10; C03C 2201/32
USPC .................................................. 336/200, 232
See application file for complete search history.

(56) References Cited

U.S. PATENT DOCUMENTS

| | | | |
|---|---|---|---|
| 2010/0151217 | A1 | 6/2010 | Kanada et al. |
| 2014/0145816 | A1* | 5/2014 | Sato .......................... H01F 5/06 336/208 |
| 2016/0254096 | A1* | 9/2016 | Adachi .................. C04B 35/18 361/321.4 |
| 2017/0352467 | A1* | 12/2017 | Kakiuchi ................ H01F 27/29 |
| 2018/0096778 | A1 | 4/2018 | Yatabe et al. |
| 2018/0319129 | A1 | 11/2018 | Sakamoto et al. |

FOREIGN PATENT DOCUMENTS

| | | | | |
|---|---|---|---|---|
| CN | 108476593 A | | 8/2018 | |
| JP | 2010-147098 A | | 7/2010 | |
| JP | 2010-147101 A | | 7/2010 | |
| JP | 2010147098 A | * | 7/2010 | |
| JP | 2017-073475 A | | 4/2017 | |
| JP | 2018-131353 A | | 8/2018 | |
| KR | 10-2018-0036610 A | | 4/2018 | |
| WO | WO-2005098879 A1 | * | 10/2005 | ......... H01C 17/0656 |
| WO | 2017/122381 A1 | | 7/2017 | |
| WO | WO-2017122381 A1 | * | 7/2017 | ............. B32B 17/06 |
| WO | WO-2017122381 A1 | * | 7/2017 | ............. B32B 17/06 |

OTHER PUBLICATIONS

An Office Action mailed by China National Intellectual Property Administration dated Jul. 1, 2021 which corresponds to Chinese Patent Application No. 202010104802.2 and is related to U.S. Appl. No. 16/814,893 with English language translation.

An Office Action; "Notice of Reasons for Refusal," mailed by the Japanese Patent Office dated Dec. 2, 2021, which corresponds to Japanese Patent Application No. 2019-043707 and is related to U.S. Appl. No. 16/814,893 with English translation.

* cited by examiner

MULTILAYER COIL COMPONENT

CROSS-REFERENCE TO RELATED APPLICATION

This application claims benefit of priority to Japanese Patent Application No. 2019-043707, filed Mar. 11, 2019, the entire content of which is incorporated herein by reference.

BACKGROUND

Technical Field

The present disclosure relates to a multilayer coil component and specifically to a multilayer coil component, for example, a multilayer common mode choke coil in which a component element assembly is formed of a glass material.

Background Art

To date, regarding various electronic apparatuses, for example, information communications terminals, compact multilayer coil components, such as common mode choke coils, have been used for suppressing noise. In accordance with an increase in frequency of communications apparatuses in recent years, multilayer coil components that efficiently suppress noise in high-frequency bands have been intensely researched and developed.

For example, as shown in FIG. 7, Japanese Unexamined Patent Application Publication No. 2017-73475 (Claim 1, FIG. 1, and the like) proposes a multilayer coil component in which magnetic layers 103a and 103b are disposed on respective principal surfaces of a dielectric glass layer 102 that includes an embedded coil conductor 101 so as to constitute a multilayer body 104, and dielectric glass layers 105a and 105b are further disposed on respective principal surfaces of the multilayer body 104 such that the multilayer body 104 is constrained by the dielectric glass layers 105a and 105b so as to suppress interlayer peeling between the dielectric glass layer 102 and the magnetic layers 103a and 103b from occurring.

In Japanese Unexamined Patent Application Publication No. 2017-73475, the glass material for forming the dielectric glass layers 102, 105a, and 105b has a lower coefficient of linear expansion than the ferrite material for forming the magnetic layers 103a and 103b, and as a result, compressive stress is applied to the dielectric glass layers 105a and 105b that are outer layers during cooling from a high temperature to normal temperature in a firing step and the like due to the above-described difference in the coefficient of linear expansion. Therefore, it is considered that even when the substrate on which the multilayer coil component is mounted is bent, structural defects, for example, cracks, can be avoided from occurring in the multilayer coil component due to the dielectric glass layers 105a and 105b.

Meanwhile, Japanese Unexamined Patent Application Publication No. 2018-131353 (Claims 1 and 8, paragraph [0013], and the like) proposes a glass ceramic sintered body having a glass phase and a ceramic phase dispersed in the glass phase, wherein the ceramic phase contains alumina ($Al_2O_3$) particles and zirconia ($ZrO_2$) particles, the glass phase contains $MO-Al_2O_3-SiO_2-B_2O_3$-based glass (M represents an alkaline earth metal), and in a cross section of the sintered body, the area ratio of the alumina particles is 0.05% to 12% and the area ratio of the zirconia particles is 0.05% to 6%, and proposes a coil electronic component including a ceramic layer composed of the glass ceramic sintered body.

In Japanese Unexamined Patent Application Publication No. 2018-131353, the ceramic layer (component element assembly) is formed of the glass ceramic sintered body, and predetermined amounts of the alumina particles and the zirconia particles serving as fillers are mixed into the glass phase having a predetermined composition such that firing can be performed at a relatively low temperature and the strength is ensured without excessively increasing the permittivity.

In Japanese Unexamined Patent Application Publication No. 2017-73475, as described above, since compressive stress is applied to the dielectric glass layers 105a and 105b that are outer layers and that are in contact with the magnetic layers 103a and 103b, structural defects, for example, cracks, can be suppressed from occurring in the multilayer coil component. However, regarding a multilayer coil component such as a multilayer common mode choke coil, attenuation characteristics (Scc21) of the common mode component are still insufficient.

That is, the attenuation characteristics of noise can be evaluated by the quality factor Q (hereafter referred to as "Q-value") which indicates sharpness of the signal at a resonant frequency, and it is considered that the Q-value has to be high to obtain favorable attenuation characteristics. It is known that a low permittivity material having a low relative permittivity is effective at obtaining a high Q-value.

However, the ferrite material for forming the magnetic layer has a higher relative permittivity than the glass material. As a result, predetermined favorable attenuation characteristics have not been obtained under such circumstances.

Meanwhile, as shown in FIG. 8, in the case in which the component element assembly is formed of the dielectric glass material as in Japanese Unexamined Patent Application Publication No. 2018-131353, an inner conductor 112 is embedded in a component element assembly 111, and outer electrodes 113a and 113b are disposed on respective end portions of the component element assembly 111. The thus formed electronic component is mounted by reflow heating treatment or the like on a substrate 115 with solder 114 interposed between the formed electronic component and the substrate 115.

In this case, since the glass material has a lower relative permittivity than the ferrite material, the Q-value is high, and the attenuation characteristics can be improved. However, compressive stress is hardly applied to the surface layer portion of the dielectric glass layer. Consequently, if the substrate is bent, tensile stress occurs in the component element assembly 111, and structural defects 116, for example, cracks, may occur in the component element assembly 111.

SUMMARY

The present disclosure was realized in consideration of such circumstances. Accordingly, the present disclosure provides a multilayer coil component, for example, a multilayer common mode choke coil, in which structural defects, for example, cracks can be suppressed from occurring while favorable attenuation characteristics are ensured even when a substrate with the multilayer coil component mounted thereon is bent.

As described above, the glass material has a lower relative permittivity than the ferrite material and can have a higher Q-value. Therefore, to improve the attenuation characteristics in a high-frequency band, it is considered to be desirable to form the entire component element assembly of the glass material.

However, in the case in which the entire component element assembly is formed of the glass material having the same component, as described above, compressive stress is hardly applied to the surface layer portion of the dielectric glass layer. Consequently, if the substrate is bent, tensile stress occurs in the component element assembly, and structural defects, for example, cracks, may occur in the multilayer coil component.

Also, the present inventor noted the difference in the coefficient of linear expansion between quartz and a common glass material, for example, borosilicate-based glass, and performed intensive research. As a result, it was found that since quartz has a higher coefficient of linear expansion than the common glass material, when the component element assembly is divided into a first dielectric glass layer in which the inner conductor is embedded and a second dielectric glass layer that is a thin layer outside the first dielectric glass layer, quartz is added to a glass material constituting the primary components of the first and second dielectric glass layers, and the quartz content in the second dielectric glass layer is set to be lower than the quartz content in the first dielectric glass layer, a difference in the coefficient of linear expansion between the first dielectric glass layer and the second dielectric glass layer can be made, compressive stress can be thereby applied to the second dielectric glass layer, and the bending strength of the multilayer coil component can be improved.

The present disclosure was realized on the basis of such findings. According to preferred embodiments of the present disclosure, a multilayer coil component includes a component element assembly in which an inner conductor is disposed and an outer electrode disposed on the surface of the component element assembly, wherein the component element assembly includes a first dielectric glass layer in which the inner conductor is embedded and second dielectric glass layers that are thin layers disposed on respective principal surfaces of the first dielectric glass layer, the primary component of each of the first dielectric glass layer and the second dielectric glass layers is formed of a glass material and has a filler component containing at least quartz, and at least one second dielectric glass layer of the second dielectric glass layers has a lower quartz content than the first dielectric glass layer.

Consequently, even when the mounting substrate is bent and tensile stress occurs in the multilayer coil component, compressive stress is applied to the second dielectric glass layer due to the difference in the quartz content between the first dielectric glass layer and the second dielectric glass layer, that is, the difference in the coefficient of linear expansion between the two. As a result, the bending strength of the multilayer coil component is enhanced, and a multilayer coil component having favorable mechanical strength capable of suppressing structural defects, for example, cracks, can be obtained. In addition, since the primary component of the entire component element assembly is formed of the glass material, a multilayer coil component having a high Q-value and favorable attenuation characteristics in a high-frequency band can be obtained. That is, a multilayer coil component having the mechanical strength and the attenuation characteristics in combination can be obtained.

In the multilayer coil component according to preferred embodiments of the present disclosure, the difference in the quartz content between the first dielectric glass layer and the at least one second dielectric glass layer is preferably about 3 parts by weight or more relative to 100 parts by weight of the glass material, more preferably about 5 parts by weight or more relative to 100 parts by weight of the glass material, and further preferably about 10 parts by weight or less relative to 100 parts by weight of the glass material.

Consequently, a multilayer coil component having favorable attenuation characteristics and mechanical strength in combination can be efficiently obtained.

In the multilayer coil component according to preferred embodiments of the present disclosure, the quartz content in each of the first dielectric glass layer and the second dielectric glass layers is preferably about 40 to 60 parts by weight relative to 100 parts by weight of the glass material.

In the multilayer coil component according to preferred embodiments of the present disclosure, preferably, the filler component contains alumina, and the at least one second dielectric glass layer has a higher alumina content than the first dielectric glass layer.

Since alumina has a higher relative permittivity than quartz but has a high Vickers hardness, the mechanical strength can be enhanced by setting the second dielectric glass layer to have a higher alumina content than the first dielectric glass layer.

In the multilayer coil component according to preferred embodiments of the present disclosure, the difference in the alumina content between the at least one second dielectric glass layer and the first dielectric glass layer is preferably about 2 parts by weight or more relative to 100 parts by weight of the glass material.

Consequently, a multilayer coil component having more favorable mechanical strength can be efficiently obtained without impairing the attenuation characteristics.

In the multilayer coil component according to preferred embodiments of the present disclosure, the alumina content in each of the first dielectric glass layer and the second dielectric glass layers is preferably about 10 parts by weight or less relative to 100 parts by weight of the glass material.

Regarding the above-described multilayer coil component, the difference in the quartz content between the first dielectric glass layer and the second dielectric glass layer is set to make a difference in the coefficient of linear expansion between the two. However, the issues of the present disclosure can also be addressed and a multilayer coil component having favorable attenuation characteristics and mechanical strength in combination can be obtained by setting the difference in the coefficient of linear expansion between the first dielectric glass layer and the second dielectric glass layer without depending on the filler component species.

That is, according to preferred embodiments of the present disclosure, a multilayer coil component includes a component element assembly in which an inner conductor is disposed and an outer electrode disposed on the surface of the component element assembly, wherein the component element assembly includes a first dielectric glass layer in which the inner conductor is embedded and second dielectric glass layers that are thin layers disposed on respective principal surfaces of the first dielectric glass layer, the primary component of each of the first dielectric glass layer and the second dielectric glass layers is formed of a glass material, and at least one second dielectric glass layer of the second dielectric glass layers has a lower coefficient of linear expansion than the first dielectric glass layer.

In the multilayer coil component according to preferred embodiments of the present disclosure, the difference in the coefficient of linear expansion between the first dielectric glass layer and the at least one second dielectric glass layer is preferably about 0.1 ppm/° C. or more and more preferably about 0.4 ppm/° C. or more.

In this manner, a multilayer coil component having favorable attenuation characteristics and mechanical strength in combination, as described above, can be efficiently obtained by setting a predetermined difference in the coefficient of linear expansion between the first dielectric glass layer and the second dielectric glass layers without depending on the filler component species. In this case, each of the first dielectric glass layer and the second dielectric glass layers may have various fillers, as the situation demands.

In the multilayer coil component according to preferred embodiments of the present disclosure, the thickness of the at least one second dielectric glass layer is preferably about 10 μm to 100 μm and preferably about 75 μm or less.

In the multilayer coil component according to preferred embodiments of the present disclosure, preferably, the at least one second dielectric glass layer is opposite a mounting substrate.

Consequently, even when the substrate is bent, and tensile stress occurs in the multilayer coil component, structural defects, for example, cracks, can be effectively suppressed from occurring.

In the multilayer coil component according to preferred embodiments of the present disclosure, preferably, the primary component of the glass material is borosilicate-based glass.

Since the borosilicate-based glass has a lower relative permittivity than the ferrite material, a multilayer coil component having favorable attenuation characteristics can be obtained.

In the multilayer coil component according to preferred embodiments of the present disclosure, preferably, the inner conductor is formed into a substantially spiral or helical shape.

In the multilayer coil component according to preferred embodiments of the present disclosure, preferably, the multilayer coil component is a multilayer common mode choke coil.

Consequently, a multilayer common mode choke coil having high strength and favorable high-frequency characteristics can be obtained.

Other features, elements, characteristics and advantages of the present disclosure will become more apparent from the following detailed description of preferred embodiments of the present disclosure with reference to the attached drawings.

DETAILED DESCRIPTION

Next, the embodiment according to the present disclosure will be described in detail.

Figure 1:
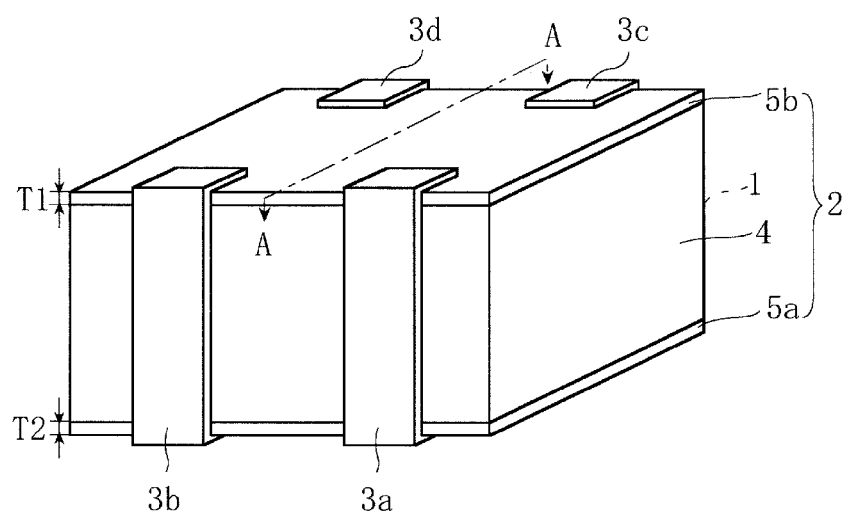
FIG. 1 is a schematic perspective view showing a multilayer common mode choke coil serving as a multilayer coil component according to an embodiment of the present disclosure.
Figure 2:
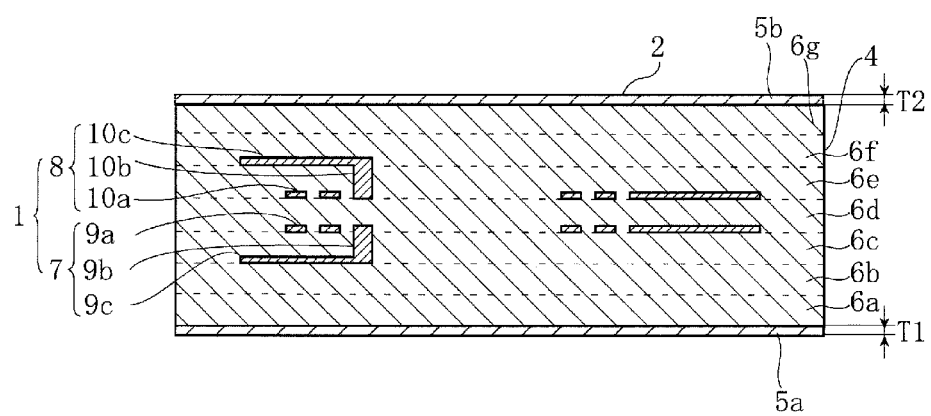
FIG. 2 is a sectional view of a section cut in the direction indicated by arrows A-A in FIG. 1.

FIG. 1 is a perspective view showing a multilayer common mode choke coil serving as a multilayer coil component according to an embodiment of the present disclosure. FIG. 2 is a sectional view of a section cut in the direction indicated by arrows A-A in FIG. 1.

In the multilayer common mode choke coil, outer electrodes 3a to 3d are disposed on the two end portions of the component element assembly 2 including an inner conductor 1.

Specifically, the component element assembly 2 has a multilayer structure including a first dielectric glass layer 4 in which the inner conductor 1 is embedded and second dielectric glass layers 5a and 5b that are thin layers with thicknesses of T1 and T2, respectively, disposed on respective principal surfaces of the first dielectric glass layer 4.

As shown in FIG. 2, the first dielectric glass layer 4 is formed from a sintered body in which a first dielectric glass sheet 6a to a seventh dielectric glass sheet 6g are stacked, the inner conductor 1 includes a first coil conductor 7 and a second coil conductor 8 that are formed into a coil-like (spiral) shape so as to equalize the winding directions, and the first coil conductor 7 and the second coil conductor 8 are embedded in the first dielectric glass layer 4. The first coil conductor 7 has a first coil portion 9a disposed on the third dielectric glass sheet 6c, a first conduction via 9b that passes through the third dielectric glass sheet 6c, and a first extended conductor portion 9c disposed on the second dielectric glass sheet 6b. The first coil portion 9a, the first conduction via 9b, and the first extended conductor portion 9c are electrically connected to each other. The second coil conductor 8 has a second coil portion 10a disposed on the fourth dielectric glass sheet 6d, a second conduction via 10b that passes through the fifth dielectric glass sheet 6e, and a second extended conductor portion 10c disposed on the fifth dielectric glass sheet 6e. The second coil portion 10a, the second conduction via 10b, and the second extended conductor portion 10c are electrically connected to each other. The present multilayer common mode choke coil is arranged such that the second dielectric glass layer 5a is opposite a mounting substrate (not shown in the drawing) and is electrically connected to the mounting substrate with solder interposed between the second dielectric glass layer 5a and the mounting substrate.

Regarding the thus formed multilayer common mode choke coil, when a current in the normal mode flows through the first coil conductor 7 and the second coil conductor 8, magnetic fluxes are generated in opposite directions with respect to the first coil conductor 7 and the second coil conductor 8, and the magnetic fluxes cancel each other out. Therefore, the function of an inductor is not performed. On the other hand, when a current in the common mode flows through the first coil conductor 7 and the second coil conductor 8, magnetic fluxes are generated in the same direction, and the function of an inductor is performed.

In this manner, the multilayer common mode choke coil does not perform the function of an inductor in the normal mode so as to transmit signal components and rather performs the function of an indictor in the common mode so as to transmit noise components. Therefore, signals and noise can be isolated from each other and the noise can be suppressed by exploiting the difference in the transmission mode.

In the present embodiment, the primary component of each of the first dielectric glass layer 4 and the second dielectric glass layers 5a and 5b is formed of a glass material and has a filler component containing at least quartz, and the second dielectric glass layers 5a and 5b are formed so as to have a lower quartz content than the first dielectric glass layer 4.

That is, the glass material typified by the borosilicate-based glass (relative permittivity: about 4.0 to 5.0) has a lower relative permittivity than the ferrite material (relative permittivity: about 10 to 20) and can obtain a high Q-value. Therefore, favorable sharp attenuation characteristics can be obtained in a high-frequency band, for example, a GHz band, and noise can be effectively suppressed. In particular, quartz has a relative permittivity of less than 4, which is still lower than the relative permittivity of the borosilicate-based glass. Therefore, a higher Q-value can be obtained, and the attenuation characteristics can be further improved.

However, in the case in which the entire component element assembly is formed of a glass material having the same composition, if the substrate on which the multilayer common mode choke coil is mounted is bent, tensile stress occurs in the substrate. Consequently, structural defects, for example, cracks, starting from a contact portion between the substrate and the end of the side surface folded portion of each of the outer electrodes 3a to 3d may occur.

That is, in the case in which the dielectric glass layer is arranged outside the magnetic layer as in Japanese Unexamined Patent Application Publication No. 2017-73475, compressive stress is applied to the dielectric glass layer serving as the outside portion in contact with the magnetic layer due to the difference in the coefficient of linear expansion between the ferrite material and the glass material. As a result, structural defects, for example, cracks, due to the tensile stress can be suppressed from occurring.

However, in the case in which the entire component element assembly is formed of a glass material having the same composition, compressive stress is hardly applied to the outer layer of the component element assembly, in particular, the surface layer portion, and if the substrate is bent, structural defects, for example, cracks, may occur due to the tensile stress from the mounting substrate.

In the present embodiment, the difference in the coefficient of linear expansion between the borosilicate-based glass and the quartz is noted, and the quartz content in the second dielectric glass layers 5a and 5b is adjusted to become lower than the quartz content in the first dielectric glass layer 4. That is, the coefficient of linear expansion of the borosilicate-based glass is lower than the coefficient of linear expansion of the quartz. Therefore, the coefficient of linear expansion of the second dielectric glass layers 5a and 5b becomes lower than the coefficient of linear expansion of the first dielectric glass layer 4 by setting the quartz content in the second dielectric glass layers 5a and 5b to be lower than the quartz content in the first dielectric glass layer 4, compressive stress is applied to the second dielectric glass layers 5a and 5b during cooling from a high temperature to normal temperature in a production process, for example, a firing step or the like, and, as a result, the mechanical strength against external stress, for example, tensile stress, can be enhanced.

In the present embodiment, since the mechanical strength of the multilayer common mode choke coil is enhanced as described above, even when the substrate is bent, structural defects, for example, cracks, can be suppressed from occurring in the multilayer common mode choke coil.

There is no particular limitation regarding the difference in the quartz content between the first dielectric glass layer 4 and the second dielectric glass layers 5a and 5b (quartz content difference) provided that compressive stress is applied to the second dielectric glass layers 5a and 5b so as not to cause structural defects, for example, cracks, in the second dielectric glass layers 5a and 5b. The quartz content difference is usually preferably about 3 to 10 parts by weight relative to 100 parts by weight of the glass material and more preferably about 5 to 10 parts by weight. If the quartz content difference is less than about 3 parts by weight relative to 100 parts by weight of the glass material, the quartz content difference is excessively small, a sufficient linear expansion coefficient difference $\Delta\alpha$ between the two is not ensured, and sufficient mechanical strength is not obtained. Meanwhile, if the quartz content difference is more than about 10 parts by weight relative to 100 parts by weight of the glass material, an increase in the absolute amount of the quartz content may cause degradation in sinterability.

There is no particular limitation regarding the quartz content in each of the first dielectric glass layer 4 and the second dielectric glass layers 5a and 5b, and the quartz content is usually preferably about 40 to 60 parts by weight relative to 100 parts by weight of the glass material.

Preferably, the filler component contained in the first dielectric glass layer 4 and in the second dielectric glass layers 5a and 5b also contains alumina. In this case, it is preferable that the second dielectric glass layers 5a and 5b have a higher alumina content than the first dielectric glass layer 4. Alumina has a relative permittivity of about 8.5 that is higher than the relative permittivity of the borosilicate-based glass or quartz and has a high Vickers hardness, and the mechanical strength can be further enhanced by setting the alumina content in the second dielectric glass layers 5a and 5b to be higher than the alumina content in the first dielectric glass layer 4.

There is no particular limitation regarding the difference in the alumina content between first dielectric glass layer 4 and the second dielectric glass layers 5a and 5b (alumina content difference) provided that the alumina content difference contributes to further enhancement of the mechanical strength, and the alumina content difference is preferably about 2 to 10 parts by weight relative to 100 parts by weight of the glass material. In the case in which the alumina content difference is less than about 2 parts by weight relative to 100 parts by weight of the glass material, an effect of addition of alumina to the second dielectric glass layers 5a and 5b is not sufficiently exerted. Meanwhile, if the alumina content difference is more than about 10 parts by weight relative to 100 parts by weight of the glass material, the sinterability may be degraded and moisture may enter the component element assembly 2.

In the case in which the first dielectric glass layer 4 and the second dielectric glass layers 5a and 5b contain alumina, there is no particular limitation regarding the alumina content provided that the content is within the range in which favorable attenuation characteristics and mechanical strength can be ensured. Usually, the alumina content is about 10 parts by weight or less relative to 100 parts by weight of the glass material.

There is no particular limitation regarding the thicknesses T1 and T2 of the second dielectric glass layers 5a and 5b, respectively, provided that these layers are thin layers in consideration of the tensile stress from the mounting substrate being applied to the surface layer portion of the component element assembly 2. The thickness is preferably about 10 to 100 μm and more preferably about 10 to 75 μm.

In the above-described multilayer common mode choke coil, the difference in the coefficient of linear expansion between the first dielectric glass layer 4 and the second dielectric glass layers 5a and 5b is caused by setting the difference in the quartz content. However, the first dielectric glass layer 4 and the second dielectric glass layers 5a and 5b may be formed such that the difference in the coefficient of linear expansion between the first dielectric glass layer 4 and the second dielectric glass layers 5a and 5b is made without depending on the filler component species. That is, a multilayer coil component having favorable attenuation characteristics and mechanical strength in combination can be obtained without depending on the filler component species by performing formation such that the coefficient of linear expansion of the second dielectric glass layers 5a and 5b becomes lower than the coefficient of linear expansion of the first dielectric glass layer 4.

As described above, the issues of the present disclosure can be addressed by causing the linear expansion coefficient difference so as to apply sufficient compressive stress to the second dielectric glass layers 5a and 5b. In this case, the first dielectric glass layer 4 and the second dielectric glass layers 5a and 5b may contain various types of fillers freely.

There is no particular limitation regarding the linear expansion coefficient difference provided that sufficient compressive stress is applied to the second dielectric glass layers 5a and 5b. The linear expansion coefficient difference is preferably about 0.1 ppm/° C. or more and more preferably about 0.4 ppm/° C. or more.

Regarding the glass material, preferably, borosilicate glass containing Si and B as primary components and having a low relative permittivity may be used, as described above. For example, preferably, borosilicate alkali glass in which Si is set to be about 70% to 85% by weight in terms of $SiO_2$, B is set to be about 10% to 25% by weight in terms of $B_2O_3$, K is set to be about 0.5% to 5% by weight in terms of $K_2O$, and Al is set to be about 0.5% by weight in terms of $Al_2O_3$ may be used.

There is no particular limitation regarding the conductor material for forming the first coil conductor 7 and the second coil conductor 8, and various conductive materials, for example, Ag, Ag—Pd, Au, Cu, and Ni, may be used. Conductive materials primarily containing Ag that is relatively inexpensive and that can be fired in an air atmosphere may be usually and preferably used.

Next, a method for manufacturing the multilayer common mode choke coil will be described in detail.

Figure 3:
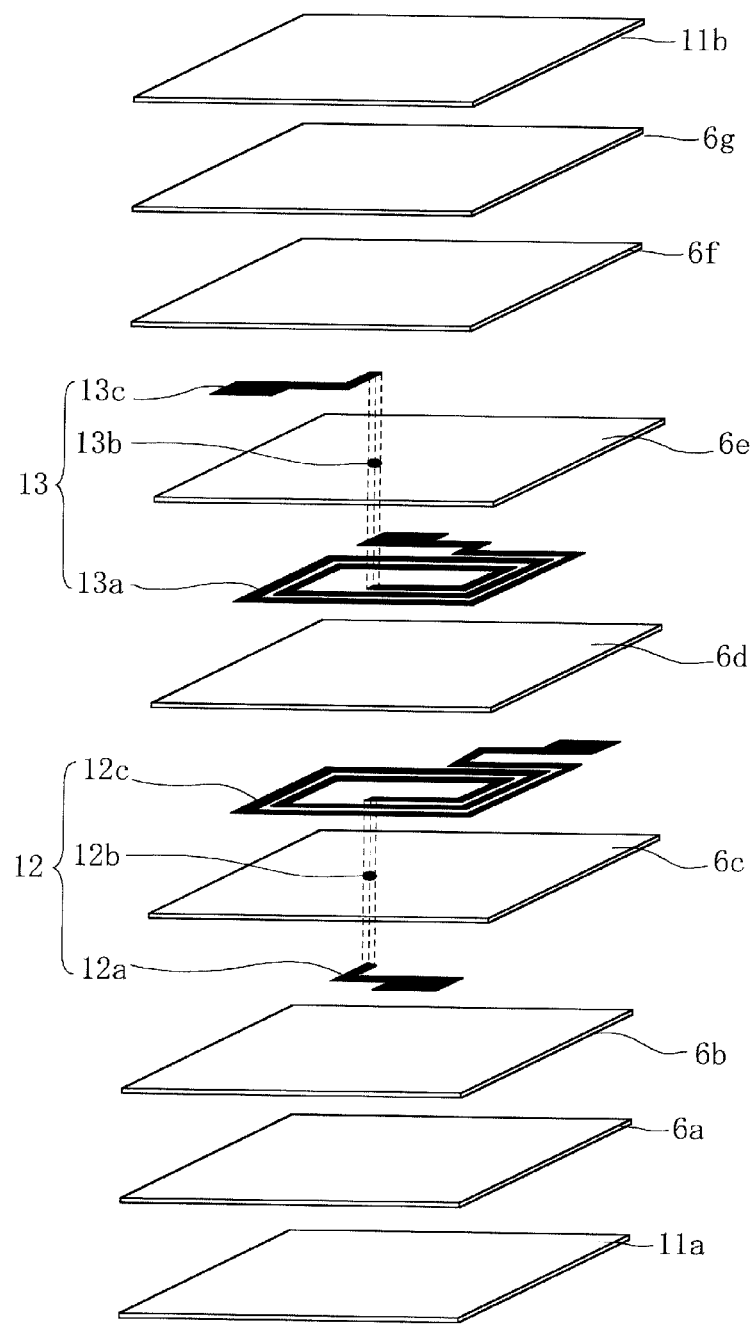
FIG. 3 is a schematic exploded perspective view showing a multilayer formed body.

FIG. 3 is a schematic exploded perspective view showing a multilayer formed body that is an intermediate product of the present multilayer common mode choke coil.

Production of First Dielectric Glass Sheet 6a to Seventh Dielectric Glass Sheet 6g A glass melt is produced by weighing glass raw materials, for example, a Si compound and a B compound, such that the composition of a glass component after firing becomes a predetermined composition, placing the resulting weighed material into a platinum crucible, and performing melting at a temperature of about 1,500° C. to 1,600° C. for a predetermined time. Subsequently, a glass material is obtained by rapidly cooling the resulting glass melt and, thereafter, performing pulverization.

Preferably about 40 to 60 parts by weight of quartz relative to 100 parts by weight of fired glass material is weighed, and as the situation demands, alumina preferably within the range of about 10 parts by weight or less is weighed. A filler component containing the quartz and the alumina is added to the glass material, mixing is performed, and the resulting mixture, an organic binder, for example, polyvinyl butyral, an organic solvent, for example, ethanol and toluene, a plasticizer, and PSZ balls are placed into a pot mill, and mixing and pulverization are performed sufficiently so as to produce a dielectric glass slurry.

Thereafter, a forming method, for example, a doctor blade method, is used, and the resulting dielectric glass slurry is formed into substantially the shape of a sheet so as to produce the first dielectric glass sheet 6a to seventh dielectric glass sheet 6g with a thickness of about 20 to 30 μm.

Production of Outer Layer Dielectric Glass Sheets 11a and 11b

A glass material is produced by using the same method and procedure as the method for producing the first dielectric glass sheet 6a to the seventh dielectric glass sheet 6g.

Subsequently, quartz is weighed such that the quartz content is lower than the quartz content of the first dielectric glass sheet 6a to the seventh dielectric glass sheet 6g and that the quartz content difference after firing is preferably about 3 to 10 parts by weight (more preferably 5 to 10 parts by weight) relative to 100 parts by weight of the glass material. Meanwhile, as the situation demands, alumina is weighed such that the alumina content is higher than the alumina content of the first dielectric glass sheet 6a to the seventh dielectric glass sheet 6g and that the alumina content difference after firing is preferably about 2 parts by weight or higher relative to 100 parts by weight of the glass material.

A filler component containing the quartz and the alumina is added to the glass material, and mixing is performed. Thereafter, a dielectric glass slurry is produced by using the same method and procedure as above.

A forming method, for example, a doctor blade method, is used, and the resulting dielectric glass slurry is formed into substantially the shape of a sheet so as to produce outer layer dielectric glass sheets 11a and 11b with a film thickness of about 10 to 100 μm.

Production of First Conductive Film 12 and Second Conductive Film 13

A conductive paste primarily containing Ag and the like is prepared. A coating method, for example, a screen printing method, is used, and the second dielectric glass sheet 6b is coated with the conductive paste so as to produce a first extended conductor pattern 12a with a predetermined form. A via hole is formed in a predetermined area of the third dielectric glass sheet 6c by laser irradiation or the like, and the via hole is filled with the conductive paste so as to form a first via conductor 12b. Thereafter, a coating method, for example, a screen printing method, is used, and a first coil pattern 12c is substantially spirally formed on the third dielectric glass sheet 6c so as to produce a first conductive film 12 composed of the first extended conductor pattern 12a, the first via conductor 12b, and the first coil pattern 12c.

Likewise, a coating method, for example, a screen printing method, is used, and the fourth dielectric glass sheet 6d is coated with the conductive paste so as to substantially spirally produce a second coil pattern 13a. A via hole is formed in a predetermined area of the fifth dielectric glass sheet 6e by laser irradiation or the like, and the via hole is filled with the conductive paste so as to form a second via conductor 13b. Thereafter, a coating method, for example, a screen printing method, is used, and a second extended conductor pattern 13c is formed on the fifth dielectric glass sheet 6e so as to produce a second conductive film 13 composed of the second coil pattern 13a, the second via conductor 13b, and the second extended conductor pattern 13c.

Production of Multilayer Common Mode Choke Coil

After the first dielectric glass sheet 6a is stacked on the outer layer dielectric glass sheet 11a, the second dielectric glass sheet 6b to the fifth dielectric glass sheet 6e provided with the conductive films 12 and 13 are stacked, a sixth dielectric glass sheet 6f, a seventh dielectric glass sheet 6g, and the outer layer dielectric glass sheet 11b are further stacked successively thereon, and heating and pressure bonding are performed. In this manner, a multilayer formed body is produced.

The resulting multilayer formed body is placed into a firing furnace, debinding treatment is performed in an air atmosphere at a heating temperature of about 350° C. to 500° C., and thereafter, firing treatment is performed at a temperature of about 800° C. to 900° C. for about 2 hours. Consequently, the outer layer dielectric glass sheets 11a and 11b, the first dielectric glass sheet 6a to the seventh dielectric glass sheet 6g, the first conductor film 12, and the second conductor film 13 are cofired. As a result, the component element assembly 2 in which the thin second dielectric glass layers 5a and 5b are formed on the respective principal surfaces of the first dielectric glass layer 4 including the inner conductor 1 (first coil conductor 7 and second coil conductor 8) embedded is obtained.

Subsequently, predetermined areas of both end portions of the component element assembly 2 are coated with an outer electrode conductive paste primarily containing Ag or the like, underlying electrodes are formed by performing baking treatment at a temperature of about 700° C. to 800° C., and Ni plating and Sn plating are successively performed thereon so as to form a Ni coating and a Sn coating on the underlying electrodes. In this manner, a first outer electrode 3a to a fourth outer electrode 3d are produced. That is, the first extended conductor portion 9c is electrically connected to the first outer electrode 3a, the first coil portion 9a is electrically connected to the third outer electrode 3c, the second coil portion 10a is electrically connected to the forth outer electrode 3d, and the second extended conductor portion 10c is electrically connected to the second outer electrode 3b. As a result, the multilayer common mode choke coil shown in FIG. 1 and FIG. 2 is produced.

The present disclosure is not limited to the above-described embodiment. For example, in the above-described embodiment, the quartz content and the alumina content of the second dielectric glass layers 5a and 5b in contact with the first dielectric glass layer 4 are adjusted. However, at least one second dielectric glass layer, specifically, the dielectric glass layer 5a opposite the mounting substrate, may be formed so as to have the quartz content and the alumina content that are different from the quartz content and the alumina content of the first dielectric glass layer 4.

The dielectric glass layers 4, 5a, and 5b may appropriately contain additives in addition to the material species within the bounds of not affecting the performance.

In the above-described embodiment, two inner conductors 1 (first coil conductor 7 and second coil conductor 8) having a substantially spiral coil shape are embedded in the first dielectric glass layer 4. However, there is no particular limitation regarding the form of the inner conductor provided that a coil-like shape is adopted, and an inner conductor formed into a substantially spiral shape by using a plurality of conduction vias may be embedded in the first dielectric glass layer 4.

In the above-described embodiment, the multilayer common mode choke coil is described as an example. However, the present disclosure may be applied to other multilayer coil components, as a matter of course.

Next, the examples according to the present disclosure will be specifically described.

Example 1

Production of Dielectric Glass Material and Measurement of Coefficient of Linear Expansion Production of Dielectric Glass Material A glass material that contained a predetermined ratio of $SiO_2$, $B_2O_3$, $K_2O$, and $Al_2O_3$ was prepared, and a quartz powder and an alumina powder serving as filler components were prepared.

The glass powder, the quartz powder, and the alumina powder were weighed and mixed such that the contents of the quartz powder and the alumina powder were set to be as shown in Table 1 relative to 100 parts by weight of the glass material. The resulting mixture, an organic binder, for example, a polyvinyl-butyral-based resin, an organic solvent, for example, ethanol and toluene, a plasticizer, and PSZ balls were placed into a ball mill, and mixing and pulverization were performed sufficiently so as to produce a dielectric glass slurry.

A doctor blade method was used, and the resulting dielectric glass slurry was formed into substantially the shape of a sheet so as to produce dielectric glass sheets with a thickness of 10 to 30 μm.

A plurality of the dielectric glass sheets were stacked and pressure-bonded by performing warm isostatic press (WIP) treatment under the conditions of a temperature of 80° C. and a pressure of 100 MPa so as to obtain a formed body. The resulting formed body was cut by using a dicer such that the external dimensions after firing became length: about 4 mm, width: about 1 mm, and height: about 1 mm, placed in a firing furnace, and fired at a temperature of 800° C. to 900° C. for 2 hours. As a result, dielectric glass materials of sample Nos. A to E were produced.

Measurement of Linear Expansion Coefficient α

Regarding dielectric glass materials of sample Nos. A to E, linear expansion coefficients α were measured in a temperature range of 20° C. to 500° C. by using a thermomechanical analyzer (Thermo plus EV02 TMA Series produced by Rigaku Corporation).

Table 1 shows the measurement results.

TABLE 1

| Sample No. | Filler component | Content relative to 100 parts by weight of glass material (parts by weight) | Linear expansion coefficient α (ppm/° C.) |
|---|---|---|---|
| A | Quartz | 53.4 | 7.4 |
|   | alumina | 4.0 | |
| B | Quartz | 50.1 | 7.3 |
|   | alumina | 4.0 | |
| C | Quartz | 46.8 | 7.0 |
|   | alumina | 4.0 | |
| D | Quartz | 43.4 | 6.5 |
|   | alumina | 4.0 | |
| E | Quartz | 53.4 | 7.9 |
|   | alumina | 1.3 | |

Production of Multilayer Common Mode Choke Coil and Measurement of Mechanical Strength Production of Multilayer Common Mode Choke Coil A Ag-based conductive paste was prepared, and a dielectric glass sheet of sample No. A was coated with the Ag-based conductive paste by using a screen printing method so as to form a substantially spiral coil pattern and an extended conductor pattern. Further, a predetermined area of the dielectric glass sheet was subjected to laser irradiation so as to form a via hole, the resulting via hole was filled with the Ag-based conductive paste so as to form a via conductor, and, thereby, first and second conductive films were produced.

A multilayer body block was obtained by stacking the dielectric glass sheets of sample No. A provided with the conductive film and the dielectric glass sheets of sample No. A not provided with the conductive film in a predetermined order, both principal surfaces of the resulting multilayer body were held between the dielectric glass sheets of any one of sample Nos. A to D, and performing pressure bonding by WIP treatment under the conditions of a temperature of 80° C. and a pressure of 100 MPa. Regarding each of sample Nos. B to D, a predetermined number of layers were stacked so as to obtain the second dielectric glass layer thickness T after firing shown in Table 2.

The resulting multilayer body block was cut by a dicer into individual pieces. The individual pieces were placed into a firing furnace and fired at a temperature of 800° C. to 900° C. for 2 hours so as to obtain component element assemblies.

Both end surfaces of the component element assembly was coated with the Ag-based conductive paste, baking treatment was performed at a temperature of about 700° C. to 800° C. so as to produce an underlying electrode, and Ni plating and Sn plating was successively performed on the underlying electrode so as to form a Ni coating and a Sn coating. In this manner, first to fourth outer electrodes were produced and multilayer common mode choke coils (samples) of sample Nos. 1 to 6 were obtained.

Regarding the external dimensions of the resulting sample, the length L was 0.65 mm, the width W was 0.50 mm, and the thickness T was 0.30 mm Evaluation of Mechanical Strength The mechanical strength of 10 each of the samples of sample Nos. 1 to 6 was evaluated by performing a bending strength test in conformity with JISC60068-2-21 (2009). That is, a glass epoxy bending strength test substrate with a length of 100 mm, a width of 40 mm, and a thickness of 1.0 mm was prepared. The sample was fixed to the substrate surface by being soldered to the surface central portion of the substrate, a load was applied from the back surface of the substrate such that the amount of bending δ was 2 mm or 3 mm and was left to stand for 5 seconds. Thereafter, whether structural defects, for example, cracks, occurred in the sample was examined by using a microscope. As a result, in the case in which a structural defect was observed in none of 10 samples was rated as good (○), and in the case in which a structural defect was observed in any sample was rated as poor (x).

Table 2 shows the test results of the filler component, the content difference ΔW between the first dielectric glass layer and the second dielectric glass layer, the second dielectric glass layer thickness T, the linear expansion coefficient difference Δα, and the bending strength of sample Nos. 1 to 6.

TABLE 2

| Sample No. | Filler component | Content relative to 100 parts by weight of glass material (parts by weight) | | Content difference ΔW (parts by weight) | Second dielectric glass layer thickness T (μm) | Linear expansion coefficient difference Δα (ppm/° C.) | Bending strength | |
|---|---|---|---|---|---|---|---|---|
| | | First dielectric glass layer | Second dielectric glass layer | | | | 2 mm | 3 mm |
| 1* | quartz | A | A | 0 | — | — | x | x |
| 2 | quartz | A | B | 3.3 | 100 | 0.1 | ○ | x |
| 3 | quartz | A | C | 6.6 | 100 | 0.4 | ○ | ○ |
| 4 | quartz | A | D | 10 | 100 | 0.9 | ○ | ○ |
| 5 | quartz | A | C | 6.6 | 50 | 0.4 | ○ | ○ |
| 6 | quartz | A | C | 6.6 | 10 | 0.4 | ○ | ○ |

An asterisked sample number indicates a sample which is out of the present disclosure Regarding sample No. 1, both the first dielectric glass layer and the second dielectric glass layer used the dielectric glass material of sample No. A, there was no difference in the quartz content between the first dielectric glass layer and the second dielectric glass layer. As a result, regarding the bending strength, in either case in which the amount of bending δ was 2 mm or 3 mm, structural defects, for example, cracks, occurred.

Meanwhile, regarding sample Nos. 2 to 6, since the quartz content in the second dielectric glass layer was lower than the quartz content in the first dielectric glass layer and the content difference ΔW was 3 parts by weight or more relative to 100 parts by weight of the glass material, the linear expansion coefficient difference Δα of 0.1 ppm/° C. or more could be ensured. It was found that, as a result, the bending strength was improved and the mechanical strength was enhanced compared with sample No. 1. In particular, it was found that, regarding sample Nos. 3 to 6, since the content difference ΔW was 5 parts by weight or more relative to 100 parts by weight of the glass material, the quartz content in the second dielectric glass layer was sufficiently lower than the quartz content in the first dielectric glass layer, and the linear expansion coefficient difference Δα of 0.4 ppm/° C. or more could be ensured, even when the amount of bending δ was 3 mm, no structural defects, for example, cracks, occurred, and the mechanical strength was sufficiently enhanced.

Example 2

Regarding the case in which the filler component included alumina in addition to quartz, an influence exerted on the mechanical strength by the alumina content difference between the first dielectric glass layer and the second dielectric glass layer was examined.

That is, the sample of sample No. 11 was produced by using the same method and procedure as in example 1 except that the dielectric glass material of sample No. E was used as the first dielectric glass layer and the dielectric glass material of sample No. B was used as the second dielectric glass layer.

Thereafter, the bending strength test was performed by using the same method and procedure as in example 1, and the mechanical strength was evaluated.

Table 3 shows the test results of the filler component, the content difference ΔW between the first dielectric glass layer and the second dielectric glass layer, the second dielectric glass layer thickness T, the linear expansion coefficient difference Δα, and the bending strength of sample No. 11. In this regard, for the sake of comparison, sample No. 2 in Table 2 is also shown in Table 3.

Regarding sample No. 11, it was found that since the first dielectric glass layer and the second dielectric glass layer had the same quartz content difference and the same second dielectric glass layer thickness T but the alumina content in the second dielectric glass layer was higher than the alumina content in the first dielectric glass layer, even though the amount of bending δ was 3 mm, no structural defects, for example, cracks, occurred and the mechanical strength was further enhanced.

That is, regarding sample No. 2 in which the first dielectric glass layer and the second dielectric glass layer had the same alumina content, no structural defects, for example, cracks, occurred when the amount of bending δ was 2 mm, and an occurrence of a structural defect was observed when the amount of bending δ was 3 mm. Therefore, it was found that the mechanical strength is further enhanced by setting the alumina content in the second dielectric glass layer to be higher than the alumina content in the first dielectric glass layer.

Example 3

Production of Comparative Example Sample

A multilayer common mode choke coil in which a component element assembly included magnetic layers was produced as a comparative example sample, and the attenuation characteristics of the example according to the present disclosure and the attenuation characteristics of the comparative example sample were compared.

Figure 4:
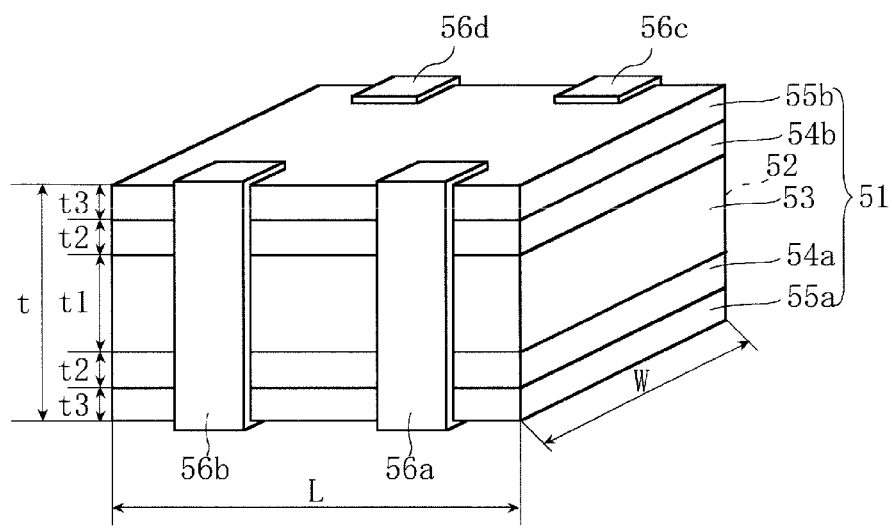
FIG. 4 is a schematic perspective view showing a comparative example sample produced in an example.

FIG. 4 is a perspective view showing a multilayer common mode choke coil as a comparative example.

In the multilayer common mode choke coil, a component main body 51 had a multilayer structure with a thickness t in which a first dielectric glass layer 53 with a thickness t1 including an inner conductor 52 embedded was interposed between a pair of magnetic layers 54a and 54b with a thickness t2 each, and a pair of second dielectric glass layers 55a and 55b with a thickness t3 each were disposed on the respective principal surfaces of the pair of magnetic layers 54a and 54b. A first outer electrode 56a to a fourth outer electrode 56d were disposed on the two end portions of the component main body 51.

The comparative example sample was produced as described below.

The dielectric glass sheet of sample No. A was used and a substantially spiral coil pattern or an extended conductor pattern was formed on the dielectric glass sheet by using the same method and procedure as in example 1. Further, a predetermined area of the dielectric glass sheet was subjected to laser irradiation so as to form a via hole, and the

TABLE 3

| Sample No. | Filler component | Content relative to 100 parts by weight of glass material (parts by weight) | | Content difference ΔW (parts by weight) | Second dielectric glass layer thickness T (μm) | Linear expansion coefficient difference Δα (ppm/° C.) | Bending strength | |
|---|---|---|---|---|---|---|---|---|
| | | First dielectric glass layer | Second dielectric glass layer | | | | 2 mm | 3 mm |
| 2 | quartz alumina | A | B | 3.3 0.0 | 100 | 0.1 | ○ | x |
| 11 | Quartz alumina | E | B | 3.3 −2.7 | 100 | 0.6 | ○ | ○ | resulting via hole was filled with the Ag-based conductive paste so as to form a via conductor.

Meanwhile, a ferrite material containing $Fe_2O_3$, ZnO, CuO, and NiO was prepared. The resulting ferrite material, an organic binder of a polyvinyl butyral base or the like, an organic solvent, for example, ethanol and toluene, and PSZ balls were placed into a ball mill again, and mixing and pulverization were performed sufficiently so as to produce a magnetic slurry. Thereafter, a doctor blade method was used, and forming into substantially the shape of a sheet was performed so as to produce magnetic sheets.

A multilayer body was formed by stacking the dielectric glass sheet not provided with the conductive film, the magnetic sheet, the dielectric glass sheet provided with the conductive film, the magnetic sheet, and the dielectric glass sheet not provided with the conductive film successively and performing pressure bonding by heating and pressurization by using the same method and procedure as in example 1. Subsequently, firing was performed at a temperature of 900° C. for 2 hours so as to produce the component main body 51. The first outer electrode 56a to the fourth outer electrode 56d were formed on the two end portions of the component main body 51. In this manner, the comparative example sample was produced.

Regarding the external dimensions of the resulting comparative example sample, the length L was 0.65 mm, the width W was 0.50 mm, and the thickness t was 0.30 mm, as in sample No. 3.

Measurement of Attenuation Characteristics

The attenuation characteristics (Scc21) of the common mode component of sample No. 3 (example of present disclosure) and the comparative example sample were measured.

Figure 5:
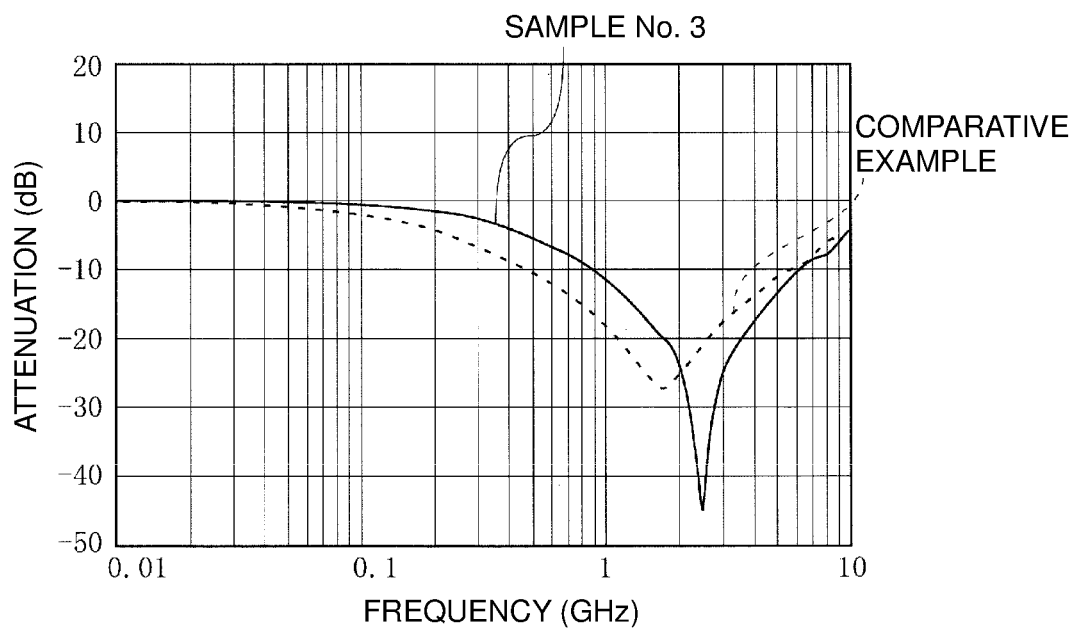
FIG. 5 is a diagram showing the attenuation characteristics of sample No. 3 and the comparative example sample.

FIG. 5 shows the measurement results. The horizontal axis indicates the frequency (GHz), and the vertical axis indicates the attenuation (dB). In FIG. 5, the solid line indicates sample No. 3 (example of present disclosure) and the broken line indicates the comparative example sample.

As is clearly shown in FIG. 5, in the high-frequency band of GHz, the attenuation of the comparative example sample gently changes in accordance with the frequency, whereas the sample No. 3 has favorable attenuation characteristics and the attenuation sharply changes in accordance with the frequency. Consequently, it is considered that since the dielectric glass material has a lower relative permittivity than the ferrite material, a high Q-value can be obtained, and the attenuation characteristics of sample No. 3 are improved compared with the comparative example sample.

Example 4

An analysis model of the multilayer coil component was formed, stress analysis was performed by using a finite element method, and the relationship between the second dielectric glass layer thickness T and the compressive stress was simulated.

Specifically, the external dimensions of the multilayer coil component were set to be length L: 0.65 mm, width W: 0.50 mm, and thickness t: 0.30 mm, and the linear expansion coefficient difference Δα between the first dielectric glass layer and the second dielectric glass layer was set to be 1.9 ppm/° C. (model 1) or 1.3 ppm/° C. (model 2). In the case in which thermal stress was applied in the direction of the length L of the component element assembly and the temperature was cooled from 800° C. to 20° C. (room temperature), the compressive stress was calculated when the second dielectric glass layer thickness T was changed from 10 to 140 μm. In this regard, simulation was performed on the assumption that a solder fillet portion formed between the mounting substrate and the multilayer coil component was in the state of no stress.

Figure 6:
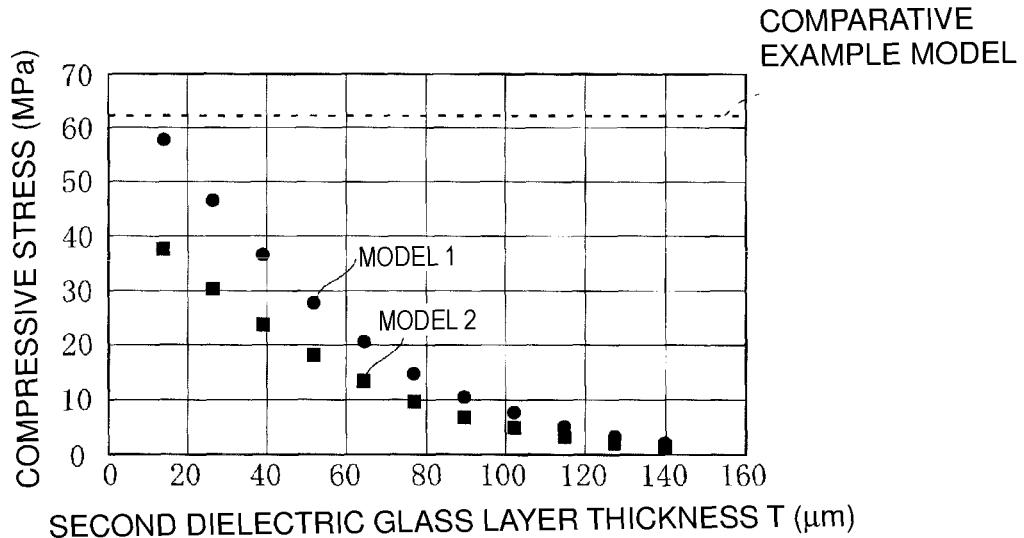
FIG. 6 is a diagram showing the relationship between a second dielectric glass layer thickness and compressive stress of each of models 1 and 2 and comparative example model.
Figure 7:
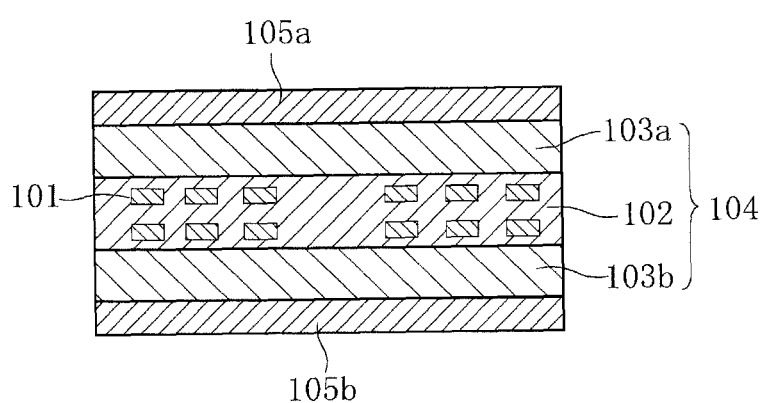
FIG. 7 is a sectional view showing a multilayer coil component of a type including a magnetic layer in the related art.
Figure 8:
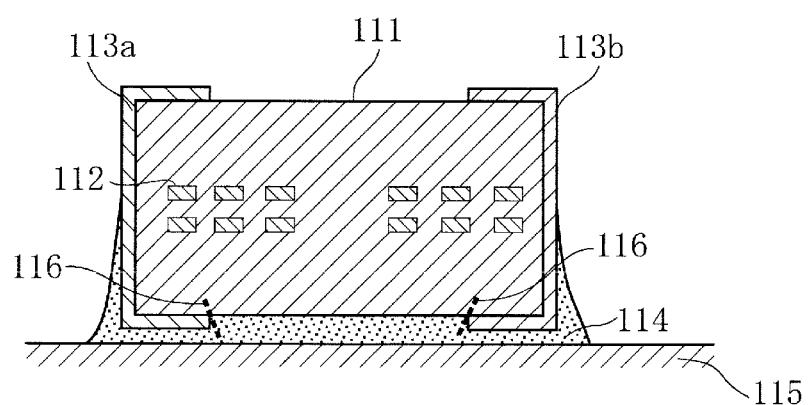
FIG. 8 is a diagram illustrating problems of a multilayer coil component formed from a dielectric glass layer alone in the related art.

FIG. 6 shows the simulation results. The horizontal axis indicates the second dielectric glass layer thickness T (μm), and the vertical axis indicates the compressive stress (MPa). In FIG. 6, the symbol ● indicates model 1 (linear expansion coefficient difference Δα: 1.9 ppm/° C.), and the symbol ■ indicates model 2 (linear expansion coefficient difference Δα: 1.3 ppm/° C.). The broken line indicates the simulation performed by using a comparative example model formed to the same specifications for the comparative example sample including the magnetic layer of example 3.

As is clearly shown in FIG. 6, regarding the comparative example model including the magnetic layer, compressive stress of about 61 MPa is applied to the second dielectric glass layer independently of the second dielectric glass layer thickness T.

Meanwhile, regarding models 1 and 2, it is shown that the compressive stress applied to the second dielectric glass layer decreases as the second dielectric glass layer thickness T increases, and when the thickness T is more than 100 μm, the compressive stress is hardly applied. That is, it is indicated that as the second dielectric glass layer thickness T decreases, greater compressive stress is applied to the second dielectric glass layer, structural defects, for example, cracks, are effectively suppressed from occurring, and the second dielectric glass layer thickness T is preferably about 10 to 100 μm and more preferably about 75 μm or less.

In addition, as is clear from the simulation results, when there is a certain difference in the coefficient of linear expansion, compressive stress is applied to the second dielectric glass layer independently of a filler component species.

Even when the component element assembly is formed of the glass material, structural defects, for example, cracks, due to bending of the substrate are suppressed from occurring in the component element assembly, and favorable attenuation characteristics and mechanical strength are ensured in combination.

While preferred embodiments of the disclosure have been described above, it is to be understood that variations and modifications will be apparent to those skilled in the art without departing from the scope and spirit of the disclosure. The scope of the disclosure, therefore, is to be determined solely by the following claims.

What is claimed is:

1. A multilayer coil component comprising:
a component element assembly in which an inner conductor is disposed, the component element assembly including a first dielectric glass layer in which the inner conductor is embedded and second dielectric glass layers that are thin layers disposed on respective principal surfaces of the first dielectric glass layer, a primary component of each of the first dielectric glass layer and the second dielectric glass layers being formed of a glass material and having a filler component containing at least quartz, and at least one second dielectric glass layer of the second dielectric glass layers having a lower quartz content than the first dielectric glass layer; and
an outer electrode disposed on the surface of the component element assembly,
wherein the quartz content in the first dielectric glass layer is 40 to 60 parts by weight relative to 100 parts by weight of the glass material, and the quartz content in the second dielectric glass layers is 43.4 to 50.1 parts by weight relative to 100 parts by weight of the glass material, and a thickness of the at least one second dielectric glass layer after firing is 10 μm to 100 μm.

2. The multilayer coil component according to claim 1, wherein a difference in the quartz content between the first dielectric glass layer and the at least one second dielectric glass layer is 3 parts by weight or more relative to 100 parts by weight of the glass material.

3. The multilayer coil component according to claim 2, wherein the difference in the quartz content is 5 parts by weight or more relative to 100 parts by weight of the glass material.

4. The multilayer coil component according to claim 2, wherein the difference in the quartz content is 10 parts by weight or less relative to 100 parts by weight of the glass material.

5. The multilayer coil component according to claim 1, wherein
the filler component contains alumina, and
the at least one second dielectric glass layer has a higher alumina content than the first dielectric glass layer.

6. The multilayer coil component according to claim 5, wherein the difference in the alumina content between the at least one second dielectric glass layer and the first dielectric glass layer is 2 parts by weight or more relative to 100 parts by weight of the glass material.

7. The multilayer coil component according to claim 5, wherein the alumina content in the first dielectric glass layer is 10 parts by weight or less relative to 100 parts by weight of the glass material, and the alumina content in the second dielectric glass layers is 10 parts by weight or less relative to 100 parts by weight of the glass material.

8. The multilayer coil component according to claim 1, wherein the thickness is 10 μm to 75 μm or less.

9. The multilayer coil component according to claim 1, wherein the at least one second dielectric glass layer is opposite a mounting substrate.

10. The multilayer coil component according to claim 1, wherein the primary component of the glass material is borosilicate-based glass.

11. The multilayer coil component according to claim 1, wherein the inner conductor is formed into a spiral or helical shape.

12. The multilayer coil component according to claim 1, wherein the multilayer coil component is a multilayer common mode choke coil.

13. A multilayer coil component comprising:
a component element assembly in which an inner conductor is disposed, the component element assembly including a first dielectric glass layer in which the inner conductor is embedded and second dielectric glass layers that are thin layers disposed on respective principal surfaces of the first dielectric glass layer, a primary component of each of the first dielectric glass layer and the second dielectric glass layers being formed of a glass material and having a filler component, and at least one second dielectric glass layer of the second dielectric glass layers having a lower coefficient of linear expansion than the first dielectric glass layer; and
an outer electrode disposed on the surface of the component element assembly,
wherein a content of the filler component in the first dielectric glass layer is 40 to 60 parts by weight relative to 100 parts by weight of the glass material, and a content of the filler component in the second dielectric glass layers is 43.4 to 50.1 parts by weight relative to 100 parts by weight of the glass material, and
a thickness of the at least one second dielectric glass layer after firing is 10 μm to 100 μm.

14. The multilayer coil component according to claim 13, wherein a difference in a coefficient of linear expansion between the first dielectric glass layer and the at least one second dielectric glass layer is 0.1 ppm/° C. or more.

15. The multilayer coil component according to claim 14, wherein the difference in the coefficient of linear expansion is 0.4 ppm/° C. or more.

\* \* \* \* \*